United States Patent
Reber et al.

(10) Patent No.: US 6,484,943 B1
(45) Date of Patent: Nov. 26, 2002

(54) METHOD AND SYSTEM FOR ASSIGNING A COMPUTER INTERACTION PRIORITY BASED ON A MACHINE-READABLE CODE

(75) Inventors: William L. Reber, Rolling Meadows, IL (US); Cary D. Perttunen, Shelby Township, MI (US)

(73) Assignee: Motorola, Inc., Schaumburg, IL (US)

( * ) Notice: Subject to any disclaimer, the term of this patent is extended or adjusted under 35 U.S.C. 154(b) by 168 days.

(21) Appl. No.: 09/705,005

(22) Filed: Nov. 2, 2000

(51) Int. Cl.[7] .................................................. G06K 7/10
(52) U.S. Cl. .............. 235/462.15; 235/375; 235/462.13
(58) Field of Search ....................... 235/462.01, 375, 235/382; 707/104.1, 5

(56) References Cited

U.S. PATENT DOCUMENTS

| | | | | |
|---|---|---|---|---|
| 5,288,976 A | * | 2/1994 | Citron et al. ................ 235/375 |
| 5,717,737 A | * | 2/1998 | Doviak et al. ................ 379/58 |
| 5,838,253 A | * | 11/1998 | Wurz et al. ............. 340/825.34 |
| 5,933,829 A | * | 8/1999 | Durst et al. .................... 707/10 |
| 5,969,324 A | * | 10/1999 | Reber et al. ........... 235/462.13 |
| 5,986,651 A | * | 11/1999 | Reber et al. ................ 345/335 |
| 5,995,105 A | * | 11/1999 | Reber et al. ................ 345/356 |
| 6,012,102 A | * | 1/2000 | Shachar ......................... 710/5 |
| 6,032,195 A | * | 2/2000 | Reber et al. ................ 709/245 |
| 6,081,827 A | * | 6/2000 | Reber et al. ................ 709/200 |
| 6,148,331 A | * | 11/2000 | Parry ........................... 709/218 |
| 6,149,063 A | * | 11/2000 | Reynolds et al. ...... 235/472.02 |

* cited by examiner

Primary Examiner—Michael G. Lee
Assistant Examiner—Ahshik Kim
(74) Attorney, Agent, or Firm—Kenneth A. Haas

(57) ABSTRACT

Machine-read bar code data is received from a network access apparatus (64). A priority level is determined based on the bar code data. The priority level is assigned for the network access apparatus (64) to interact with a computer via a computer network (12).

17 Claims, 2 Drawing Sheets

METHOD AND SYSTEM FOR ASSIGNING A COMPUTER INTERACTION PRIORITY BASED ON A MACHINE-READABLE CODE

TECHNICAL FIELD

The present invention relates to methods and systems for navigating a computer network.

BACKGROUND OF THE INVENTION

Two commonly-used techniques for navigating to destinations of a computer network, such as the enternet, include: (a) manually entering a Uniform Resource Locator (URL) into a command line of a Web browser, and (b) clicking on a hyperlink displayed by a Web browser. Manually entering URLs having a long sequence of characters may be undesirable for some end users.

Various recently-proposed techniques for navigating to destinations of the Internet use bar codes to obviate manual entering of URLs. U.S. Pat. Nos. 5,930,767, 5,938,726, 5,940,595, 5,969,324, 5,986,651, 5,995,105, 6,032,195 and 6,081,827, which are assigned to Motorola, Inc. and are hereby incorporated by reference into the present disclosure, disclose various approaches to computer network navigation using bar codes.

Regardless of whether a user manually enters a URL, clicks on a hyperlink or swipes a bar code, interaction with the destination may have a less than desired performance. International Business Machines (IBM) has announced a bandwidth allocation technology which allows information to be prioritized according to different levels of priority. The bandwidth allocation technology runs on a network processor within a computer network element such as a router or a switch.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF PREFERRED EMBODIMENTS

Figure 1:
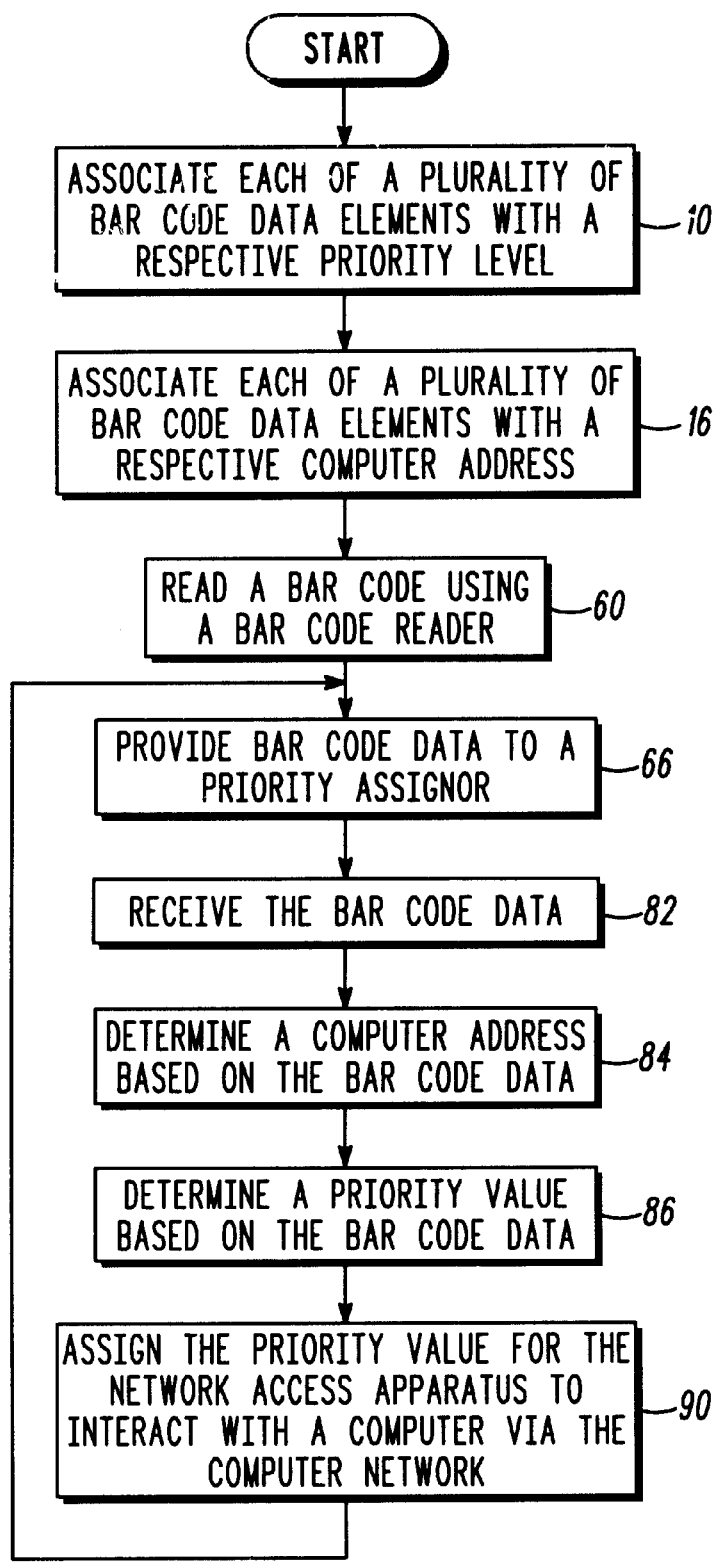
FIG. 1 is a flow chart of an embodiment of a method of network navigation and prioritization using a bar code.

Embodiments of the present invention provide computer network navigation methods and systems which prioritize interaction with a computer network resource based on a bar code. Embodiments are described with reference to FIG. 1, which shows a flow chart of an embodiment of a method of network navigation and prioritization using a bar code, and FIG. 2, which shows a block diagram of an embodiment of a system for network navigation and prioritization using a bar code.

As indicated by block 10, the method comprises associating each of a plurality of bar code data elements with a respective priority level. Each bar code data element comprises either some data or all of the data encoded within a bar code. Examples of bar codes include, but are not limited to, one-dimensional and two-dimensional bar codes.

Each respective priority level indicates a desired level of priority service for interaction via a computer network 12. Examples of the computer network 12 include, but are not limited to, an internet, an intranet and an extranet.

The priority level is usable by a network processor 14 within the computer network 12 to manage traffic on the computer network 12. The network processor 14 is capable of accepting different levels of priority for different information payloads, and managing traffic on the computer network 12 in accordance therewith. Examples of the network processor 14 include those sold by IBM under the brand name of PowerNP. The network processor 14 may be embedded in a computer network element such as a router or a switch.

As indicated by block 16, the method optionally comprises associating each of a plurality of bar code data elements with a respective computer address. Each bar code data element comprises either some data or all of the data encoded within a bar code. Examples of each computer address include, but are not limited to, a URL, a uniform resource name (URN), a uniform resource identifier (URI) and an Internet protocol (IP) address.

With reference to blocks 10 and 16, the same bar code data element encoded within a bar code may be associated with both a priority level and a computer address. Alternatively, a first bar code data element encoded within a bar code may be associated with a priority level, and a second bar code data element encoded within the bar code may be associated with a computer address.

The associations of the bar code data elements with the priority levels and the computer addresses are made using a computer-readable medium 20. The computer-readable medium 20 embodies data for each association between a bar code data element and a priority level, and each association between a bar code data element and a computer address. All of the data may be embodied in the form of a database, a lookup table, an associative memory, and/or computer program code. Examples of the computer-readable medium 20 include a computer-readable storage medium and a computer-readable communication medium. Examples of computer-readable storage media include, but are not limited to, an electronic medium such as a computer memory, a magnetic medium such as a floppy disk or a hard disk, and an optical medium such as an optical disk. Examples of computer-readable communication media include, but are not limited to, an electronic medium, an optical medium and an electromagnetic medium.

For purposes of illustration and example, the computer-readable medium 20 comprises computer-readable data 22 which associates a bar code data element 24 with a priority level 26 and a computer address 30, a bar code data element 32 with a priority level 34 and a computer address 36, a bar code data element 40 with a priority level 42 and a computer address 44, and a bar code data element 46 with a priority level 50 and a computer address 52. Typically, the computer-readable medium 20 embodies computer-readable data associating a multiplicity of bar code data elements (i.e. many more than four) with a multiplicity of respective priority levels and a multiplicity of respective computer addresses.

Also for purposes of illustration and example, consider the priority levels 26 and 42 to be the same, the priority levels 34 and 50 to be the same, and the priority levels 26 and 42 to differ from the priority levels 34 and 50. Although only two different priority levels are illustrated, it is noted that the present disclosure contemplates use of any plurality of different priority levels.

With regard to the computer addresses, consider the computer addresses 30, 36 and 44 to differ from each other, and the computer address 52 to be the same as the computer address 30.

As indicated by block 60, the method comprises machine-reading a bar code using a bar code reader 62. The bar code reader 62 is associated with a network access apparatus 64. The network access apparatus 64 may have various implementations. Absent the bar code reader 62, examples of the network access apparatus 64 include, but are not limited to, a computer, a personal digital assistant, a set-top box, a Web telephone, a two-way pager, a game player and various wireless network access apparatus. The bar code reader 62 may be either integrated with, attached to, or otherwise in communication with any of the aforementioned apparatus. Of particular interest is the network access apparatus 64 comprising a Web-enabled, wireless handheld device, such as a Web-enabled cellular telephone, having an integrated bar code reader. Also of interest is the bar code reader 62 being integrated with, attached to, or otherwise in communication with a remote control for an internet television or an internet set-top box.

Figure 2:
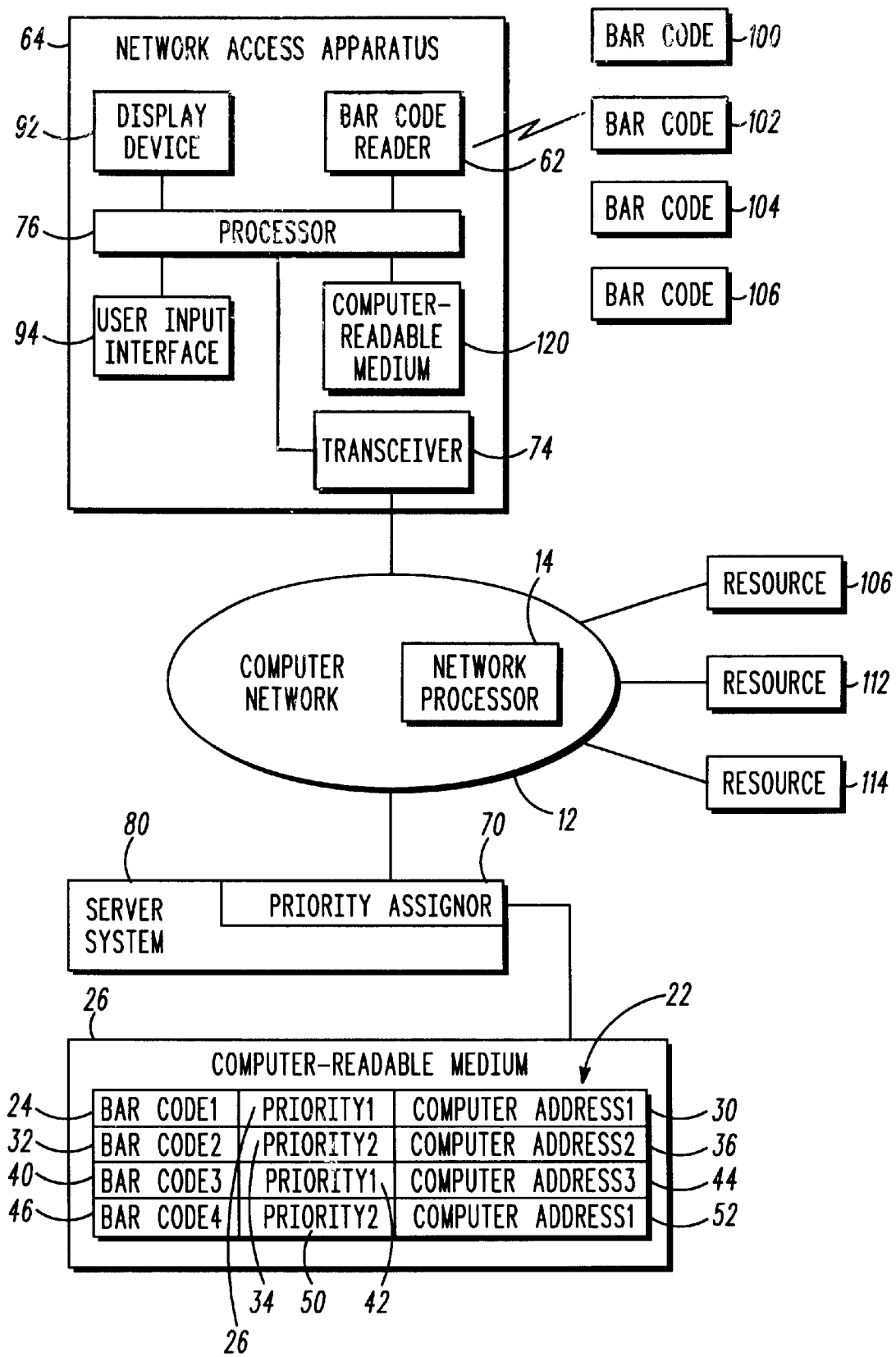
FIG. 2 is a block diagram of an embodiment of a system for network navigation and prioritization using a bar code.

As indicated by block 66, the method comprises providing data from the bar code to a priority assignor 70. As illustrated in FIG. 2, the priority assignor 70 may be located remotely from the network access apparatus 64. In this case, the network access apparatus 62 provides data from the bar code to the priority assignor 70 via the computer network 12.

The network access apparatus 64 comprises a transceiver 74 directed by a processor 76 to facilitate navigation to the priority assignor 70 via the computer network 72. For example, the transceiver 74 may send one or more messages to attempt to link to a server system 80 which provides the priority assignor 70. Thereafter, the transceiver 74 may be directed by the processor 76 to transmit bar code data to the priority assignor 70 via the computer network 72. Alternatively, the transceiver 74 may be directed by the processor 76 to append bar code data to a computer address for the priority assignor 70. Examples of the transceiver 74 include, but are not limited to, a wireless radio frequency transceiver, a wireless modem, a dial-up modem, a cable modem and a network interface card.

The processor 76 may comprise one or more microprocessors, one or more microcontrollers, or other implementations of a logic circuit. The processor 76 either directs or assists in directing acts performed by various components of the network access apparatus 64. The processor 76 may be directed by computer-readable content of a computer-readable medium. Examples of the computer-readable medium include a computer-readable storage medium and a computer-readable communication medium. Examples of computer-readable storage media include, but are not limited to, an electronic medium such as a computer memory, a magnetic medium such as a floppy disk or a hard disk, and an optical medium such as an optical disk. Examples of computer-readable communication media include, but are not limited to, an electronic medium, an optical medium and an electromagnetic medium.

The priority assignor 70 is capable of matching received bar code data with bar code data elements stored by the computer-readable medium 20. Using the aforementioned capability, the priority assignor 70 is capable of determining which priority level is associated with the received bar code data, and optionally which computer address is associated with the received bar code data.

As indicated by block 82, the method comprises receiving the bar code data from the network access apparatus 64. The bar code data is received by the server system 80 via the computer network 72.

As indicated by block 84, the method optionally comprises determining a computer address based on the bar code data. Preferably, this act comprises determining which of the computer addresses stored by the computer-readable medium 20 has an associated bar code data element which matches the received bar code data. The aforementioned computer address associated with the aforementioned bar code data element is retrieved and/or otherwise determined using the computer-readable medium 20.

As indicated by block 86, the method comprises determining a priority value based on the bar code data. Preferably, this act comprises determining which of the priority values stored by the computer-readable medium 20 has an associated bar code data element which matches the received bar code data. The aforementioned computer address associated with the aforementioned bar code data element is retrieved and/or otherwise determined using the computer-readable medium 20.

With reference to blocks 84 and 86, both the priority level and the computer address may be determined based on the same portion of the received bar code data. Alternatively, the bar code data may comprise a first portion and a second portion, wherein the priority level is determined based on the first portion independent of the second portion, and the computer address is determined based on the second portion independent of the first portion.

As indicated by block 90, the method comprises assigning the priority value for the network access apparatus 64 to interact with a computer via the computer network 12. Optionally, the computer is accessible via the computer network 12 at the computer address determined in block 84. The priority value is used by the network processor 14 to manage traffic in the computer network 12.

The priority assignor 70 may communicate the priority value to the network processor 14 via the computer network 12. Alternatively, the priority assignor 70 may communicate the priority value to the network access apparatus 64 which, in turn, communicates the priority value to the network processor 14 via the computer network 12.

The network processor 14 may use the priority value either for unidirectional communication from the network access apparatus 64 to the computer, for unidirectional communication from the computer to the network access apparatus 64, or for bidirectional communication between the network access apparatus 64 and the computer.

The priority assignor 70 may further assist in facilitating navigation to the computer address determined in block 84. In this case, the priority assignor 70 may communicate the computer address to the network access apparatus 64 via the computer network 12. The processor 76 directs the transceiver 74 to receive the computer address via the computer network 12. Using the computer address, the processor 76 directs the transceiver 74 to facilitate navigation to a computer network resource. For example, the transceiver 74 may send one or more messages to attempt to link to a server which provides the computer network resource at the computer address, and to request the computer network resource. Further, the transceiver 74 may receive the requested computer network resource in the form of one or more response messages from the server.

Media content received from the computer network resource may be processed by the processor 76 based on markup data received from the computer network resource. The processor 76 provides a display signal to a display device 92 to display the marked-up content. The requested computer network resource may be a Web page, for example, having visible content and/or audible content. Examples of the display device 92 include, but are not limited to, a liquid crystal display, a cathode ray tube, a computer monitor, a field emission display, a television and a display on a wireless communication device such as a wireless telephone.

An end user may navigate within or otherwise interact with the computer network resource using a user input interface 94. The user input interface 94 senses one or more user-initiated actions, and generates signals based thereon. Examples of the user input interface 94 include, but are not limited to, any combination of a touch-sensitive screen of the display device 92, a mouse, a trackball, a pointing stick, a touch pad, a joystick, a keyboard, and a voice input device.

Using the network access apparatus 64, the end user may bookmark the computer network resource to facilitate subsequent navigation thereto. Optionally, the priority value associated with the computer network resource is stored with the bookmark. Using this augmented bookmark, subsequent interaction between the network access apparatus 64 and the computer network resource via the computer network 12 may be assigned the same priority value as if the bar code were read again.

Flow of the method may be redirected back to block 60, wherein a subsequent act of machine-reading another bar code is performed. Thereafter, subsequent bar code data is processed to determine an associated priority, and optionally, an associated computer address. The priority is assigned for the network access apparatus 64 to interact with a computer at the associated computer address via the computer network 12.

Acts performed by the priority assignor 70 may be directed by computer-readable content of a computer-readable medium. Examples of the computer-readable medium include a computer-readable storage medium and a computer-readable communication medium. Examples of computer-readable storage media include, but are not limited to, an electronic medium such as a computer memory, a magnetic medium such as a floppy disk or a hard disk, and an optical medium such as an optical disk. Examples of computer-readable communication media include, but are not limited to, an electronic medium, an optical medium and an electromagnetic medium. The server system 80 may comprise either a single server computer or a plurality of computers to provide the priority assignor 70.

For purposes of illustration and example, consider four different bar codes 100, 102, 104 and 106. The bar code 100 encodes the bar code data element 24, the bar code 102 encodes the bar code data element 32, the bar code 104 encodes the bar code data element 40, and the bar code 106 encodes the bar code data element 46. Also, consider the priority levels 34 and 50 being higher priority than the priority levels 26 and 42.

Further, consider the computer addresses 30 and 52 identifying a computer network resource 110, the computer address 36 identifying a computer network resource 112, and the computer address 44 identifying a computer network resource 114. The computer network resources 110, 112 and 114 may be provided by one or more server computers. In general, each of the computer network resources 110, 112 and 114 may have any physical location relative to others of the computer network resources 110, 112 and 114. Thus, any pair of the computer network resources 110, 112 and 114 may be either local to each other or remote from each other.

In response to reading the bar code 100 using the bar code reader 62, the priority assignor 70 determines that data from the bar code 100 matches the bar code data element 24. The priority assignor 70 determines that the priority level 26 and the computer address 30 are associated with the bar code data element 24. The priority assignor 70 directs the network processor 14 to assign the priority level 26 for interaction between the network access apparatus 64 and the computer network resource 110 identified by the computer address 30. The priority assignor 70 may further assist in facilitating the network access apparatus 64 to automatically navigate to the computer network resource 110.

In response to reading the bar code 106 using the bar code reader 62, the priority assignor 70 determines that data from the bar code 106 matches the bar code data element 46. The priority assignor 70 determines that the priority level 50 and the computer address 52 are associated with the bar code data element 46. The priority assignor 70 directs the network processor 14 to assign the priority level 50 for interaction between the network access apparatus 64 and the computer network resource 110 identified by the computer address 52. The priority level 50 is a higher priority than the priority level 26 associated with the bar code 100. Thus, using the bar code 106 rather than the bar code 100, media content from the computer network resource 110 may be faster communicated to the network access apparatus 64. The priority assignor 70 may further assist in facilitating the network access apparatus 64 to automatically navigate to the computer network resource 110.

In response to reading the bar code 104 using the bar code reader 62, the priority assignor 70 determines that data from the bar code 104 matches the bar code data element 32. The priority assignor 70 determines that the priority level 34 and the computer address 36 are associated with the bar code data element 32. The priority assignor 70 directs the network processor 14 to assign the priority level 34 for interaction between the network access apparatus 64 and the computer network resource 112 identified by the computer address 36. The priority assignor 70 may further assist in facilitating the network access apparatus 64 to automatically navigate to the computer network resource 112.

In response to reading the bar code 106 using the bar code reader 62, the priority assignor 70 determines that data from the bar code 106 matches the bar code data element 40. The priority assignor 70 determines that the priority level 42 and the computer address 44 are associated with the bar code data element 40. The priority assignor 70 directs the network processor 14 to assign the priority level 42 for interaction between the network access apparatus 64 and the computer network resource 114 identified by the computer address 44. The priority assignor 70 may further assist in facilitating the network access apparatus 64 to automatically navigate to the computer network resource 114.

Thus, there have been described herein several embodiments including a preferred embodiment of method and system for assigning a computer interaction priority based on a machine-readable code.

It will be apparent to those skilled in the art that the disclosed invention may be modified in numerous ways and may assume many embodiments other than the preferred form specifically set out and described above. For example, some or all of the acts described with reference to the priority assignor 70 may be performed by either the processor 76 of the network access apparatus 64 or the network processor 14 rather than the priority assignor 70. The computer-readable data 22 may be stored by a computer-readable medium 120 of the network access apparatus 64 to assist the processor 76 in performing priority assignment acts.

Further, embodiments may be used to prioritize interaction with a greater number of computer network resources than illustrated in FIG. 2. Potential computer network resources include all of those available via the World Wide Web.

Still further, some of the acts described with reference to FIG. 1 may be performed either in an alternative order or concurrently with other acts.

Yet still further, alternative machine-readable codes may be substituted for the herein-disclosed bar codes. Examples of alternative machine-readable codes include, but are not limited to, alternative optical codes, codes from radio frequency tags, magnetic codes and electronic codes. Regardless of their form, the machine-readable codes are readable by a manual machine-readable code reader, i.e. a reader handled by the end user to read the code. These codes contrast codes which are non-manually read, for example those readable by a floppy disk drive, a hard disk drive, a CD reader or a DVD reader. Other examples of alternative machine-readable codes include audio codes from a broadcast and audio codes from a pre-recorded medium.

Accordingly, it is intended by the appended claims to cover all modifications of the invention which fall within the true spirit and scope of the invention.

What is claimed is:

1. A method comprising:
   receiving bar code data from a network access apparatus;
   associating each of a plurality of bar code data elements with a respective priority and a respective computer address;
   determining a priority based on the bar code data;
   assigning the priority for the network access apparatus to interact with a computer via a computer network;
   wherein said determining the priority comprises determining which respective priority has an associated bar code data element which matches the received bar code data; and
   wherein said determining the computer address comprises determining which respective computer address has the associated bar code data element which matches the received bar code data.

2. The method of claim 1 further comprising:
   associating each of a plurality of bar code data elements with a respective priority;
   wherein said determining the priority comprises determining which respective priority has an associated bar code data element which matches the received bar code data.

3. The method of claim 1 further comprising:
   determining a computer address of the computer based on the bar code data.

4. The method of claim 3 wherein the bar code data comprises a first portion and a second portion, wherein said determining the priority is based on the first portion but not the second portion, and wherein said determining the computer address is based on the second portion but not the first portion.

5. The method of claim 1 wherein said associating comprises:
   associating a first bar code data element with a first computer address and a first priority; and
   associating a second bar code data element with the first computer address and a second priority, wherein the second priority differs from the first priority.

6. The method of claim 5 wherein said associating further comprises:
   associating third bar code data with a second computer address and the first priority.

7. A computer-readable medium comprising computer-readable content which directs a first computer to perform acts of:
   receiving bar code data from a network access apparatus;
   associating each of a plurality of bar code data elements with a respective priority and a respective computer address;
   determining a priority based on the bar code data;
   assigning the priority for the network access apparatus to interact with a second computer via a computer network;
   wherein said determining the priority comprises determining which respective priority has an associated bar code data element which matches the received bar code data; and
   wherein said determining the computer address comprises determining which respective computer address has the associated bar code data element which matches the received bar code data.

8. The computer-readable medium of claim 7 wherein the computer-readable content further directs the first computer to perform an act of:
   associating each of a plurality of bar code data elements with a respective priority;
   wherein said determining the priority comprises determining which respective priority has an associated bar code data element which matches the received bar code data.

9. The computer-readable medium of claim 7 wherein the computer-readable content further directs the first computer to perform an act of:
   determining a computer address of the second computer based on the bar code data.

10. The computer-readable medium of claim 9 wherein the bar code data comprises a first portion and a second portion, wherein said determining the priority is based on the first portion but not the second portion, and wherein said determining the computer address is based on the second portion but not the first portion.

11. The computer-readable medium of claim 7 wherein said associating comprises:
    associating a first bar code data element with a first computer address and a first priority; and
    associating a second bar code data element with the first computer address and a second priority, wherein the second priority differs from the first priority.

12. The computer-readable medium of claim 11 wherein said associating further comprises:
    associating third bar code data with a second computer address and the first priority.

13. A system comprising:
    a priority assignor to receive bar code data from a network access apparatus, to determine a computer address of the computer based on the bar code data, to determine a priority based on the bar code data, and to assign the priority for the network access apparatus to interact with a computer via a computer network;
    wherein the bar code data comprises a first portion and; a second portion, wherein the priority assignor is to determine the priority based on the first portion but not the second portion, and wherein the priority assignor is to determimne the computer address based on the second portion but not the first portion.

14. The system of claim 13 further comprising:
    a computer-readable medium which associates each of a plurality of bar code data elements with a respective priority;

wherein the priority assignor cooperates with the computer-readable medium to determine the priority by determining which respective priority has an associated bar code data element which matches the received bar code data.

15. The system of claim 13 further comprising:

a computer-readable medium which associates each of a plurality of bar code data elements with a respective priority and a respective computer address;

wherein the priority assignor cooperates with the computer-readable medium to determine the priority by determining which respective priority has an associated bar code data element which matches the received bar code data, and to determine the computer address by determining which respective computer address has the associated bar code data element which matches the received bar code data.

16. The system of claim 15 wherein the computer-readable medium comprises computer-readable data which associates a first bar code data element with a first computer address and a first priority, and associates a second bar code data element with the first computer address and a second priority, wherein the second priority differs from the first priority.

17. The system of claim 16 wherein the computer-readable data further associates third bar code data with a second computer address and the first priority.

* * * * *